(12) United States Patent
Takamori et al.

(10) Patent No.: US 8,805,105 B2
(45) Date of Patent: Aug. 12, 2014

(54) IMAGE COMPRESSION APPARATUS, IMAGE EXPANSION APPARATUS, AND METHODS AND PROGRAMS THEREOF

(75) Inventors: Tetsuya Takamori, Kanagawa-ken (JP); Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 13/457,025

(22) Filed: Apr. 26, 2012

(65) Prior Publication Data

US 2012/0275718 A1 Nov. 1, 2012

(30) Foreign Application Priority Data

Apr. 27, 2011 (JP) ................................ 2011-099195

(51) Int. Cl.
*G06K 9/36* (2006.01)

(52) U.S. Cl.
CPC ....................... *G06K 9/36* (2013.01)
USPC ........................................................ 382/238

(58) Field of Classification Search
CPC ......... G06K 9/46; G06K 9/66; G06K 9/3241; G06K 9/42; G06K 9/62; G06K 9/00275; G06K 9/6247; G06K 9/36; H04N 5/2628; H04N 7/26021; H04N 7/26053; H04N 7/26079; H04N 7/26111; H04N 7/26196; H04N 7/26276; H04N 7/26941; H04N 19/006; H04N 19/009; H04N 19/00096; H04N 19/00127; H04N 19/00145; H04N 19/00169; H04N 19/00248; H04N 19/0026; H04N 19/004; H04N 19/00418; H04N 19/00545; H04N 19/0751; H04N 19/00757; H04N 19/00842; H04N 19/00884; H04N 19/009091; G06T 3/4053; G06T 5/00; G06T 5/001; G06T 5/30

See application file for complete search history.

(56) References Cited

U.S. PATENT DOCUMENTS

| 6,690,724 | B1 | 2/2004 | Kadono | |
|---|---|---|---|---|
| 6,801,665 | B1 * | 10/2004 | Atsumi et al. | 382/239 |
| 7,020,335 | B1 * | 3/2006 | Abousleman | 382/199 |
| 7,027,655 | B2 * | 4/2006 | Keeney et al. | 382/239 |

(Continued)

FOREIGN PATENT DOCUMENTS

| JP | 10-257505 A | 9/1998 |
|---|---|---|
| WO | WO 2011/013606 A1 | 2/2011 |
| WO | WO 2011/013608 A1 | 2/2011 |
| WO | WO 2011-013610 A1 | 2/2011 |

OTHER PUBLICATIONS

Japanese Office Action issued on Jun. 4, 2013 in corresponding Japanese Patent Application No. 2011-099195.

*Primary Examiner* — Jose Couso
(74) *Attorney, Agent, or Firm* — Birch, Stewart, Kolasch & Birch, LLP

(57) ABSTRACT

An image compression apparatus capable of compressing an input image that includes a predetermined target object at a high compression ratio while allowing high quality image restoration. In the apparatus, the input image is reduced and compressed. A region of interest corresponding to a predetermined target object is set in the input image. A partial area image of an expanded image of the compressed reduced image corresponding to the region of interest is converted to a high resolution image by applying a prediction process that uses a learning result obtained by learning the predetermined object in advance. With respect to the region of interest portion, a differential image between the image converted to the high resolution and the input image is generated and encoded. Reduced image compression data and differential image encoded data are outputted.

8 Claims, 8 Drawing Sheets

(56) References Cited

U.S. PATENT DOCUMENTS

| | | | |
|---|---|---|---|
| 7,221,804 B2 * | 5/2007 | Atsumi et al. | 382/239 |
| 8,345,983 B2 * | 1/2013 | Noguchi et al. | 382/190 |
| 2009/0016426 A1 | 1/2009 | Sato et al. | |
| 2012/0114226 A1 | 5/2012 | Kameyama | |
| 2012/0128238 A1 | 5/2012 | Kameyama | |
| 2012/0134579 A1 | 5/2012 | Kameyama | |

* cited by examiner

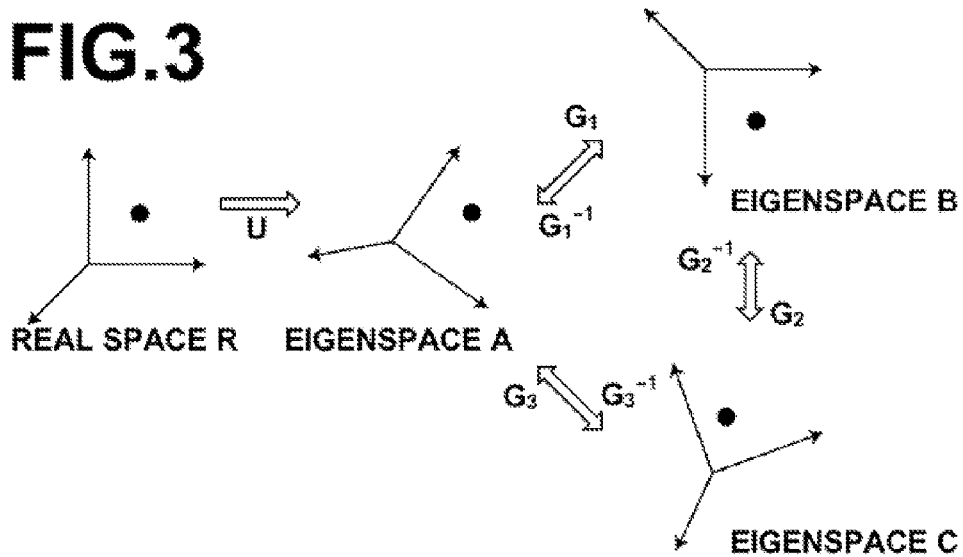
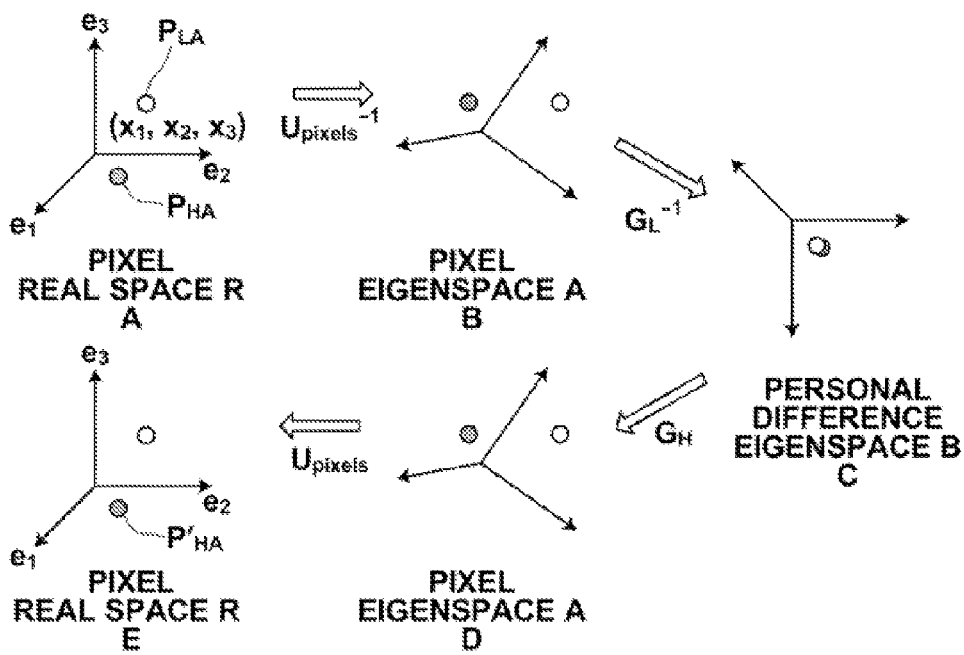

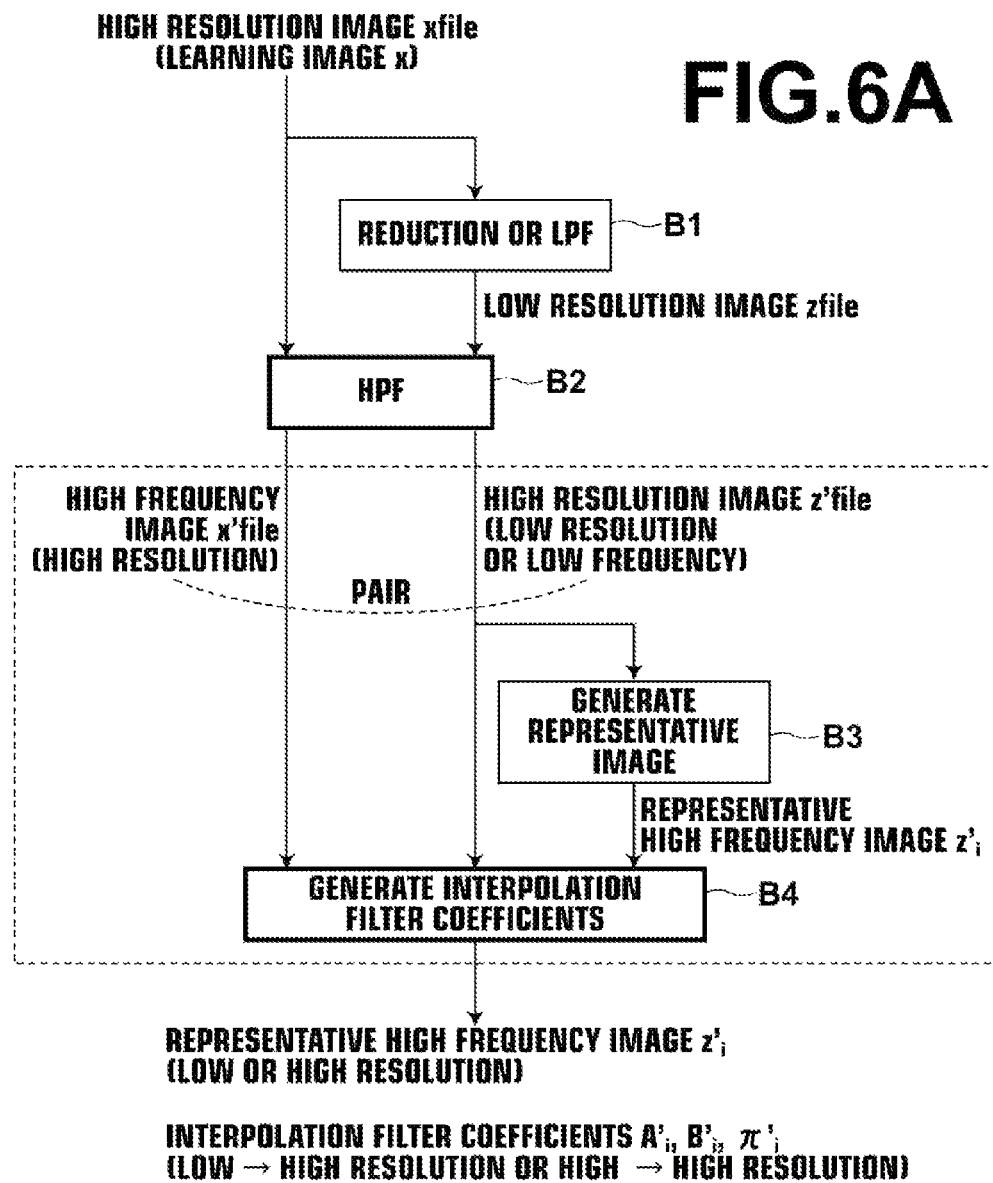

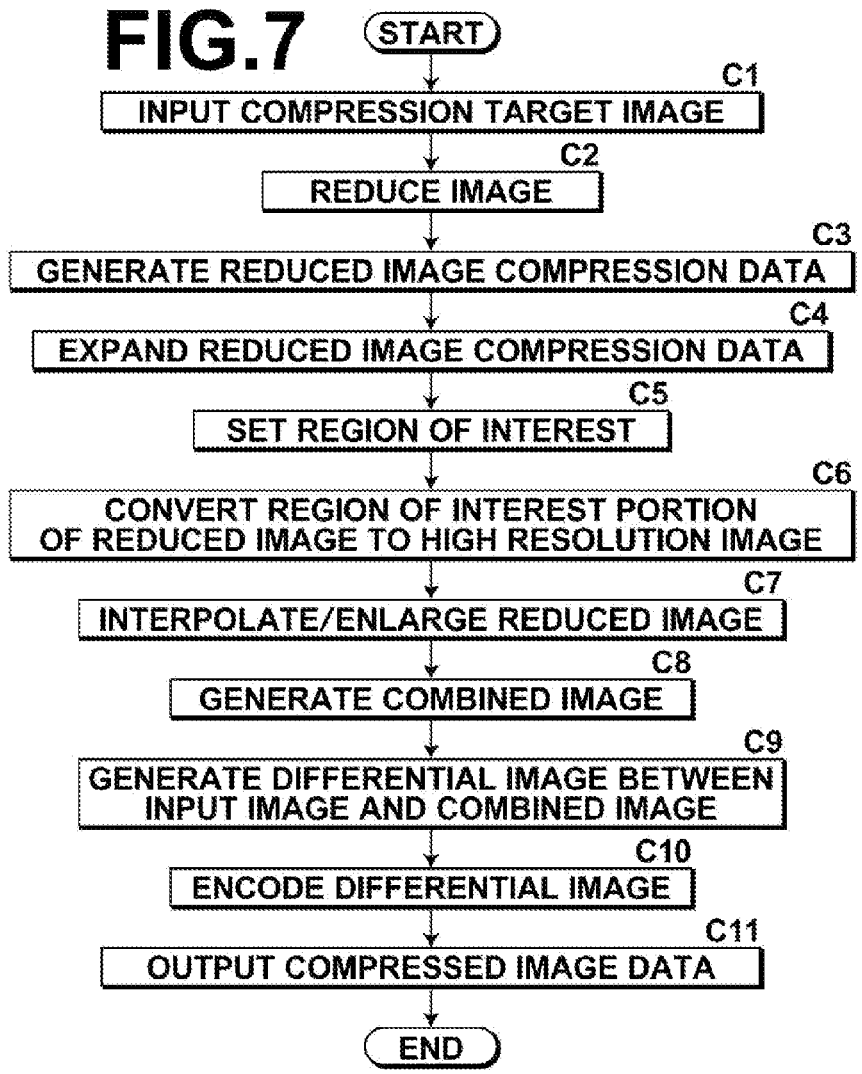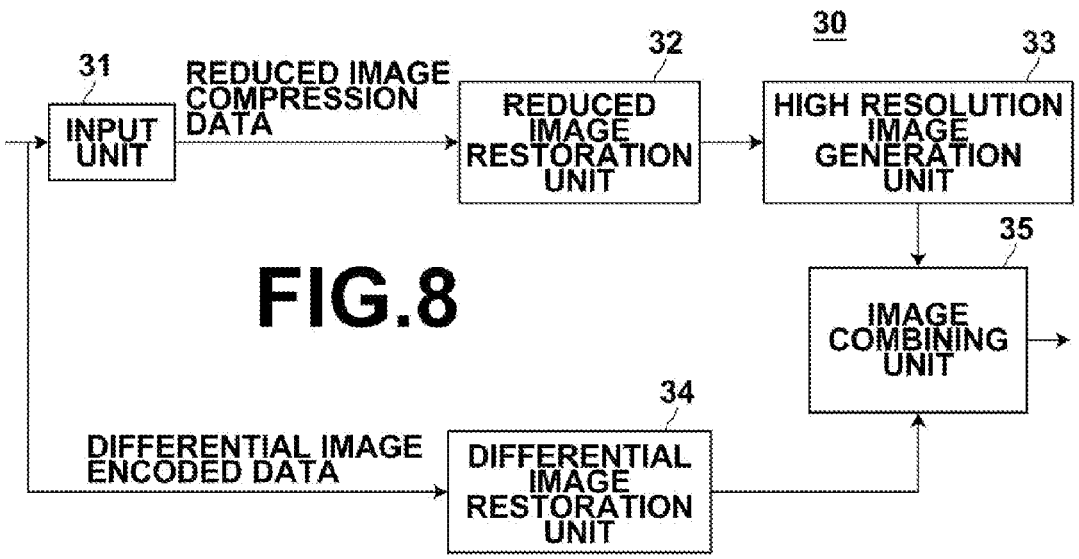

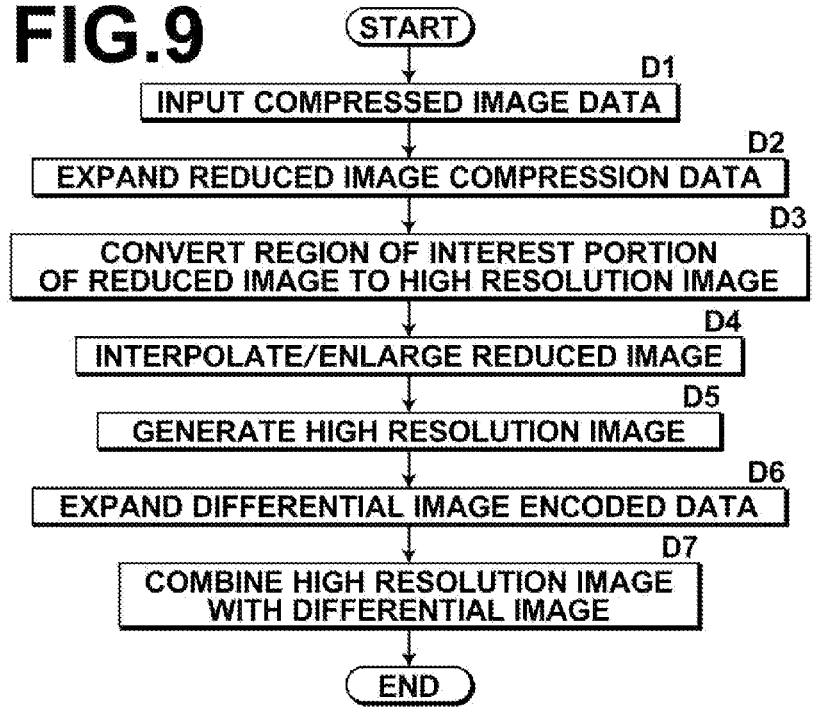
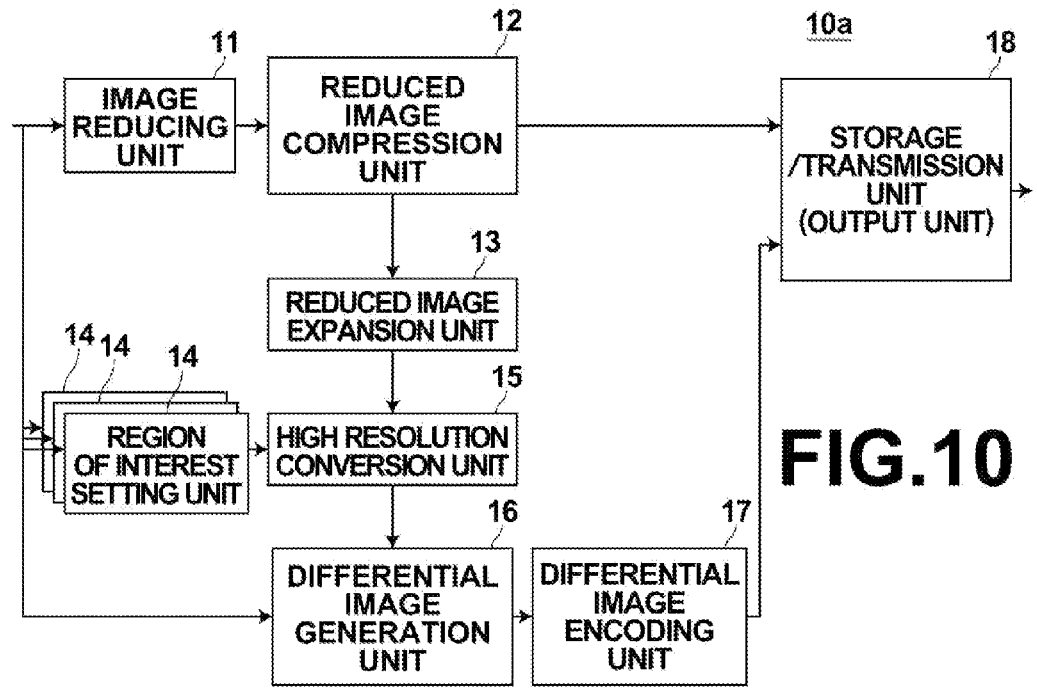

IMAGE COMPRESSION APPARATUS, IMAGE EXPANSION APPARATUS, AND METHODS AND PROGRAMS THEREOF

BACKGROUND OF THE INVENTION

1. Field of the Invention

The present invention relates to an image compression apparatus, method, and program, and more specifically to an image compression apparatus for compressing image data of moving picture or still image to a size smaller than the original data size. The invention also relates to an image expansion apparatus, method, and program for restoring image data compressed by the image compression apparatus.

2. Description of the Related Art

Generally, in the signal compression or encoding techniques, the compressed or encoded data size and quality of a signal obtained by restoring the compressed or encoded data are in a trade-off relationship. That is, if you try to reduce the data size, the signal quality will be degraded greatly, while if you try to avoid signal quality degradation, the data size will become large. In the signal compression or encoding, it is desirable that the signal data size after compression is small while the original signal quality is maintained as much as possible.

U.S. Patent Application Publication No. 20090016426 (Patent Document 1) describes an encoding scheme using a differential signal for encoding an input signal. In Patent Document 1, the encoding apparatus reduces the data size by downsampling an input signal and encodes the reduced input signal to generate first encoded information. Then, the first encoded information is decoded and the decoded data are upsampled to take a difference between the upsampled data and original input signal. Then, the encoding apparatus encodes a differential signal generated by taking the difference to generate second encoded information and transmits the first and second encoded information to a transmission line.

The decoding apparatus in Patent Document 1 receives the first and second encoded information via the transmission line. The decoding apparatus generates first decoded information by decoding the first encoded information and upsamples the first decoded information. Further, the decoding apparatus generates second decoded information (differential signal) by decoding the second encoded information. Then, the apparatus adds the upsampled first decoded information to the second decoded information and outputs the added signal as a regenerated signal corresponding to the input signal.

Here, encoding apparatuses, in general, have unique characteristics that cause quality degradation of decoded signals. In Patent Document 1, impulse response for adjustment is learned using input signals for leaning and impulse response for adjustment is convoluted in the upsampled decoded signal in order to cope with this problem. More specifically, the impulse response for adjustment is convoluted in the decoded information of the upsampled first encoded information in the encoding apparatus. Then, a difference between the signal convoluted with the impulse response for adjustment and the original input signal is calculated and the differential signal is encoded to generate second encoded information. In the decoding apparatus, the impulse response for adjustment is convoluted in the upsampled first decoded information and the second decoded information is added thereto. In doing so, Patent Document describes that the characteristics unique to the encoding apparatus may be cancelled out.

In Patent Document 1, a uniquely appearing defect or noise is learned. By convoluting the impulse response for adjustment in the upsampled decoded signal, a uniquely appearing defect or noise as a certain frequency characteristic may be corrected. Generally, however, the phase between compression noise and image is not constant and the impulse response for adjustment obtained by learning may become a coarsely classified pattern. Consequently, the difference between the signal convoluted with the impulse response for adjustment and the original input signal does not become sufficiently small in general image information. Further, in the case where data is reduced to a small size after compression, noise remains in a generally important object, such as a character or a person's face, having characteristics, such as having detailed image information and quick in motion, resulting inappropriate information for use.

In view of the circumstances described above, it is an object of the present invention to provide an image compression apparatus, method, and program capable of compressing an input image that includes a predetermined target object at a high compression ratio while maintaining a high image quality. It is a further object of the present invention to provide an image expansion apparatus, method, and program for expanding data compressed by the image compression apparatus of the present invention.

SUMMARY OF THE INVENTION

In order to achieve the aforementioned objects, the present invention provides an image compression apparatus, including:

an image reducing unit for reducing an input image having a first resolution at a predetermined reduction ratio to generate a reduced image having a second resolution lower than the first resolution;

a reduced image compression unit for compressing the reduced image to generate reduced image data;

a reduced image expansion unit for expanding the reduced image data;

a region of interest setting unit for setting a region of interest corresponding to a predetermined target object in the input image;

a high resolution conversion unit for converting a partial image of an area of the expanded reduced image corresponding to the region of interest to a partial image having the first resolution by applying a prediction process that uses a learning result obtained by learning the predetermined object in advance;

a differential image generation unit for generating a differential image by taking a difference between the partial image converted to the first resolution and a partial image of the region of interest portion of the input image;

a differential image encoding unit for encoding the differential image to generate differential image data; and an output unit for outputting the reduced image data and the differential image data.

In the present invention, the prediction process may be a process that uses a characteristic amount for segmenting a target.

The region of interest setting unit may be provided in plurality, and the plurality of region of setting units may set regions of interest respectively, each corresponding to each of a plurality of different types of target objects.

The output unit may be a unit that further outputs position information of the region of interest set by the region of interest setting unit, in addition to the reduced image data and the differential image data.

The high resolution conversion unit may be a unit that enlarges at least a portion of the expanded reduced image other than an area corresponding to the region of interest to a size of the input image by applying a prediction process that uses a learning result obtained by learning images in advance and generates a combined image by combining the enlarged image and the partial image converted to the first resolution, and the differential image generation unit may be a unit that generates a difference between the input image and the combined image as a differential image.

In the aforementioned case, the high resolution conversion unit may be a unit that, when enlarging the expanded reduced image, predicts and interpolates information not included in the expanded reduced image by applying a prediction process focusing on a general characteristic of an image signal.

Further, the invention provides an image expansion apparatus for expanding an image compressed by the use of the image compression apparatus of the present invention, including:

an input unit for inputting the reduced image data and the differential image data outputted from the image compression apparatus;

a reduced image restoration unit for restoring a reduced image by expanding the reduced image data;

a high resolution image generation unit for converting a partial image of an area of the restored reduced image corresponding to the region of interest to a partial image having the first resolution by applying a prediction process that uses a learning result obtained by learning a predetermined target object in advance, enlarging at least a portion of the restored reduced image other than the area of the restored reduced image corresponding to the region of interest to a size of the input image of the image compression apparatus, and superimposing the enlarged image and the partial image converted to the first resolution on top of each other to generate a high resolution image;

a differential image restoration unit for restoring a differential image by decoding the differential image data; and an image combining unit for combining the high resolution image with the restored differential image to restore an image corresponding to the input image of the image compression apparatus.

Still further, the invention provides an image compression method, including the steps of:

reducing an input image having a first resolution at a predetermined reduction ratio to generate a reduced image having a second resolution lower than the first resolution;

compressing the reduced image to generate reduced image data;

expanding the reduced image data;

setting a region of interest corresponding to a predetermined target object in the input image;

converting a partial image of an area of the expanded reduced image corresponding to the region of interest to a partial image having the first resolution by applying a prediction process that uses a learning result obtained by learning the predetermined object in advance;

generating a differential image by taking a difference between the partial image converted to the first resolution and a partial image of the region of interest portion of the input image;

encoding the differential image to generate differential image data; and outputting the reduced image data and the differential image data.

Further, the invention provides an image expansion method for expanding an image compressed by the use of the image compression apparatus of the present invention, including the steps of:

inputting the reduced image data and the differential image data outputted from the image compression apparatus;

restoring a reduced image by expanding the reduced image data;

converting a partial image of an area of the expanded reduced image corresponding to the region of interest to a partial image having the first resolution by applying a prediction process that uses a learning result obtained by learning the predetermined object in advance;

enlarging at least a portion of the restored reduced image other than the area of the restored reduced image corresponding to the region of interest to a size of the input image of the image compression apparatus;

superimposing the enlarged image and the partial image converted to the first resolution on top of each other to generate a high resolution image;

restoring a differential image by decoding the differential image data; and combining the high resolution image with the restored differential image to restore an image corresponding to the input image of the image compression apparatus.

Still further, the invention provides a recording medium on which is recorded an image compression program for causing a computer to perform the steps of:

reducing an input image having a first resolution at a predetermined reduction ratio to generate a reduced image having a second resolution lower than the first resolution;

compressing the reduced image to generate reduced image data;

expanding the reduced image data;

setting a region of interest corresponding to a predetermined target object in the input image;

converting a partial image of an area of the expanded reduced image corresponding to the region of interest to a partial image having the first resolution by applying a prediction process that uses a learning result obtained by learning the predetermined object in advance;

generating a differential image by taking a difference between the partial image converted to the first resolution and a partial image of the region of interest portion of the input image;

encoding the differential image to generate differential image data; and outputting the reduced image data and the differential image data Further, the invention provides a recording medium on which is recorded an image expansion program for expanding an image compressed by executing the image compression program described above, the image expansion program causing a computer to perform the steps of:

inputting the reduced image data and the differential image data outputted from the image compression apparatus;

restoring a reduced image by expanding the reduced image data;

converting a partial image of an area of the expanded reduced image corresponding to the region of interest to a partial image having the first resolution by applying a prediction process that uses a learning result obtained by learning the predetermined object in advance;

enlarging at least a portion of the restored reduced image other than the area of the restored reduced image corresponding to the region of interest to a size of the input image of the image compression apparatus;

superimposing the enlarged image and the partial image converted to the first resolution on top of each other to generate a high resolution image;

restoring a differential image by decoding the differential image data; and combining the high resolution image with the restored differential image to restore an image corresponding to the input image of the image compression apparatus.

In the present invention, a reduced image obtained by reducing an input image is compressed and expanded, a differential image between an image obtained by converting the expanded reduced image to high resolution and the original input image is encoded, and reduced image compression data and differential image encoded data are outputted on the image compression side. An image obtained by expanding the reduced image compression data and converting the expanded reduced image compression data to high resolution and an image obtained by decoding the differential image encoded data are combined on the image expansion side. Use of the differential image allows an input image inputted to the image compression apparatus to be restored with a high quality. Further, a region of interest corresponding to a predetermined target object is set in the input image. When converting the reduced image to a high resolution image, a partial image of an area of the reduced image corresponding to the region of interest is converted to high resolution by applying a prediction process that uses a learning result obtained by learning the predetermined object in advance. In the present invention, conversion from a low resolution image to a high resolution image is performed using a result of learning a predetermined target object, whereby a high resolution image of the predetermined target object may be predicted from a low resolution image of the predetermined target object with high prediction accuracy. Consequently, with respect to the predetermined target object portion (region of interest portion), the difference between the image converted to high resolution and the original input image may be reduced and the input image that includes the predetermined target object may be compressed with a compression ratio higher by the amount corresponding to the reduced amount in difference.

BRIEF DESCRIPTION OF THE DRAWINGS

FIG. 3 is a conceptual diagram of a tensor projection.

FIG. 4 illustrates a principle for applying the tensor projection to super resolution image conversion.

FIG. 6A illustrates a schematic configuration for learning step.

FIG. 7 is a flowchart illustrating an image compression procedure.

FIG. 8 is a block diagram of an image expansion apparatus of the present invention illustrating a schematic configuration thereof.

FIG. 9 is a flowchart illustrating an image expansion procedure.

FIG. 10 is a block diagram of an image compression apparatus according to a second embodiment of the present invention, illustrating a schematic configuration thereof.

DESCRIPTION OF THE PREFERRED EMBODIMENTS

Figure 1:
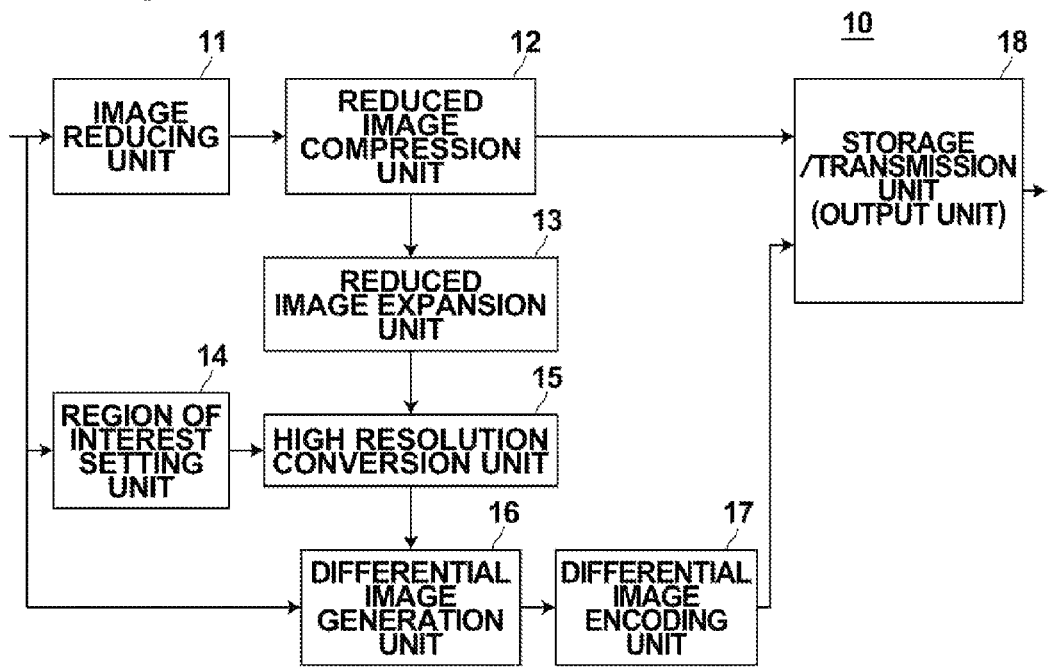
FIG. 1 is a block diagram of an image compression apparatus according to a first embodiment of the present invention, illustrating a schematic configuration thereof.

Hereinafter, embodiments of the present invention will be described in detail with reference to the accompanying drawings. FIG. 1 illustrates an image compression apparatus according to a first embodiment of the present invention. The image compression apparatus 10 includes an image reducing unit 11, a reduced image compression unit (encoding unit) 12, a reduced image expansion unit 13, a region of interest (ROI) setting unit 14, a high resolution conversion unit 15, a differential image generation unit 16, a differential image encoding unit 17, and a storage/transmission unit 18. The operation of each unit in the image compression apparatus 10 may be realized by a computer that performs processing according to a predetermined program.

The image compression apparatus 10 receives an image having a first resolution. The input image may be a still image or a moving picture. The image reducing unit 11 reduces the first resolution input image at a predetermined reduction ratio to generate a reduced image having a second resolution lower than the first resolution. The image reducing unit 11 reduces an input image to an image which is, for example, ¼ or ⅛ of a size of the original input image. According to a predetermined algorithm, the reduced image compression unit 12 compresses (encodes) the reduced image to generate reduced image compression data. Any known image compression (image encoding) method may be used for the compression of the reduced image.

The reduced image expansion unit 13 expands the reduced image compression data generated by the reduced image compression unit 12 and restores the reduced image. The reduced image expansion unit 13 performs image expansion according to an algorithm corresponding to the image compression algorithm used by the reduced image compression unit 12. In the case where the compression performed by the reduced image compression unit 12 is lossy compression, the reduced image restored (restored reduced image) does not exactly correspond to the reduced image before being compressed by the reduced image compression unit 12. The restored reduced image, however, represents the same content as that of the reduced image before being compressed by the reduced image compression unit 12, although some of the information is missing. In the case where the compression is lossless compression, the restored reduced image exactly corresponds to the reduced image before being compressed by the reduced image compression unit 12.

The region of interest setting unit 14 sets a region of interest corresponding to a predetermined target object in the input image. The predetermined target object may be, for example, a person's face, and the region of interest setting unit 14 may set an area of the input image where the person's face appears as the region of interest. For example, the region of interest setting unit 14 may detect a person's face from the input image and may set an area of the input image where the detected person's face is present as a region of interest. Alternatively, the region of interest setting unit 19 may receive a person's face detection result from outside and a region of interest may be set by the region of interest setting unit 14 based on the received detection result or manually by the user. In the case where a plurality of faces is present in one input image, the region of interest setting unit 19 may set a plurality of regions of interest in the one input image.

The high resolution conversion unit 15 converts a partial image of an area of a restored reduced image expanded by the reduced image expansion unit 13 corresponding to a region of interest set by the region of interest setting unit 14 to a high resolution (first resolution) partial image. A learning-based super resolution technique may be used for this conversion. The high resolution conversion unit 15 may convert a partial image of an area of a restored reduced image corresponding to the region of interest to an image having the first resolution by applying a prediction process that uses a learning result obtained by learning the predetermined target object in advance.

Further, the high resolution conversion unit 15 enlarges the restored reduced image to a size of the input image by applying a prediction process that uses a learning result obtained by learning images in advance. In the case where the input image is reduced, for example, to ¼ of the original size by the image reducing unit 11, the high resolution conversion unit 15 enlarges the restored reduced image to 9 times its size. The image enlargement is not necessarily performed on the entirety (entire area) of the restored reduced image and may be performed at least on a portion other than an area corresponding to the region of interest set by the region of interest setting unit 14. The high resolution conversion unit 15 combines the enlarged image of the restored reduced image with the partial image converted to the first resolution to generate a combined image.

The differential image generation unit 16 generates a differential image between the input image and combined image generated by the high resolution conversion unit 15. In the area corresponding to the region of interest, a difference between the partial image of the region of interest in the input image and the partial image of the area corresponding to the region of interest converted to the first resolution becomes a pixel value of the differential image. Meanwhile, in an area corresponding to an area other than the region of interest, a difference between an image portion of the input image other than the region of interest and an image portion of the enlarged restored reduced image other than the area corresponding to the region of interest becomes a pixel value of the differential image.

The differential image encoding unit 17 encodes the differential image generated by the differential image generation unit 16 and outputs differential image encoded data. A lossless compression algorithm may be used for the encoding algorithm in the differential image encoding unit 17. The differential image encoding unit 17 may selectively (limitation, quantization, use of only low frequency signals after DCT (discrete cosine transform), or a combination thereof) encode a signal that greatly contributes to image quality from the differential image (differential signals).

The storage/transmission unit 18, which corresponds to the output unit, outputs the reduced image compression data generated by the reduced image compression unit 12 and differential image encoded data generated by the differential image encoding unit 17. For example, the storage/transmission unit 18 may store the reduced image compression data and differential image encoded data on a predetermined recording medium. Alternatively, the storage/transmission unit 18 may transmits the reduced image compression data and differential image encoded data to a device on the data expansion side via a network. Further, the storage/transmission unit 18 may output position information of the region of interest set by the region of interest setting unit 14 in addition to the reduced image compression data and differential image encoded data.

Figure 2:
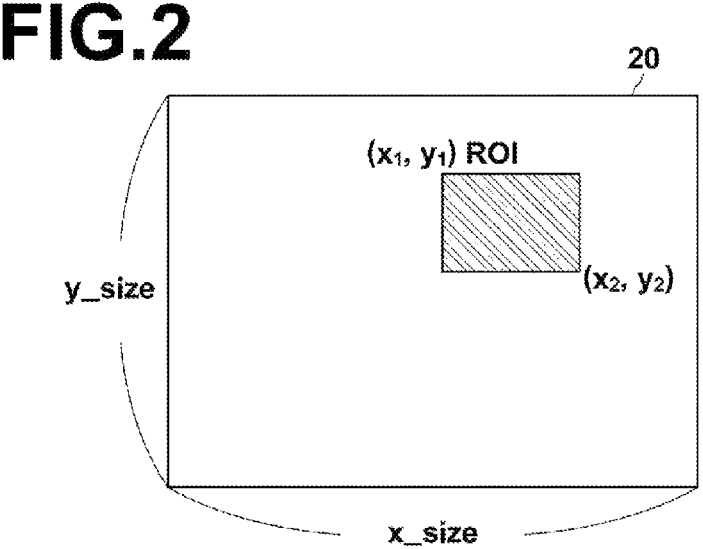
FIG. 2 is a diagram illustrating a region of interest set in an input image.

FIG. 2 is a diagram illustrating a region of interest set in an input image. The size of the input image 20 is assumed to be x_size×y_size. The region of interest setting unit 14 sets a region of interest 21, for example, in an area of the input image 20 where a predetermined target object appears. For example, the region of interest is represented by a rectangle. In this case, the position of the region of interest may be specified by a coordinate pair of upper left $(x_1, y_1)$ and lower right $(x_2, y_2)$. The area of the reduced image (restored reduced image) corresponding to the region of interest may be represented, for example, by coordinates obtained by reducing the coordinates of the region of interest at a predetermined reduction ratio. The region of interest is not necessarily represented by a rectangle and may be represented by any shape.

With respect to the region of interest 21, the high resolution conversion unit 15 performs a prediction process that uses a learning result obtained by learning the predetermined target object appearing in a region of interest and generates, from an image of an object portion of the restored reduced image having a low resolution (second resolution), a high resolution (first resolution) object portion image. As for the prediction process, a prediction process using a characteristic amount for segmenting a target, to be described below, may be used.

The prediction process for segmenting a target will be described. This prediction process uses a projective transformation. First, the principle of the projective transformation for restoring a low resolution image to a high resolution image will be described. Here, the projective transformation for restoring a low resolution face image to a high resolution face image will be specifically described. In a preparatory stage, face image data of a plurality of persons are learned in advance in a learning step and a function that defines the transformation relationship is obtained. In a restoration step, a high quality output image is restored from a (low quality) input image using the transformation function obtained in the learning step.

As a learning image set used in the learning step, for example, a learning image group which includes low and high resolution image pairs of 60 person's faces is provided. A low resolution image may be generated, for example, by skipping pixels at regular intervals from a counterpart high resolution learning image. For example, each high resolution image has a pixel size of 64×98 and each low resolution image has a pixel size of 32×24. Each pixel in the high resolution image and low resolution image takes a tone value (pixel value) in the range from 0 to 255. In the learning step, a transformation function (tensor defining projection) is generated by learning the correspondence relationship between each pair of a low resolution learning image and a corresponding original high resolution image (images of the same content of the same person).

Dimensional alignment between the input and output allows input space and output space to be handled in the same space (coordinate axes), thereby facilitating calculations. In the learning step, each low resolution image is used after being enlarged by an appropriate method in order to match the number of pixels of learning data of each low resolution image to that of the corresponding high resolution image. The pixel correspondence relationship (positional relationship) between the low and high resolution images having the same number of pixels is determined in one-to-one relation, whereby pixels in both images will have the same number of dimensions and may be treated as points (coefficient vectors) in the same coordinate space.

In the learning step, one image is divided into a plurality of square blocks (also, referred to as "patches"), each having a predetermined number of pixels, and an arithmetic operation is performed on each patch. For example, an image with a pixel size of 64×48 is divided into 48 units (patches) of 8×8 pixels and an arithmetic operation is performed on each patch. The number of pixel per patch times the number of patches (number of divisions) becomes the total number of processing for one image.

Table 1 below shows modality variations and number of dimensions of each modality.

TABLE 1

| Modality Number | Modality | Number of Dimensions |
|---|---|---|
| No. 1 | Number of Pixels | 8 × 8 |
| No. 2 | Resolution | 2 |
| No. 3 | Patch Position | 48 |
| No. 4 | Personal Difference | 60 |

In addition to the above, modalities such as face orientations and face expressions may be added. More specifically, as the face orientations, ten patterns (number of dimensions of ten) in which face orientation is changed in ten different directions within the range from "right to front to left" and, as the face expressions, four patterns (number of dimensions of four) of normal, smiling, angry, and crying may be added.

The number of types of modalities corresponds to the order of a nuclear tensor G that defines the projective relationship. The product of the number of dimensions of each modality corresponds to the number of components of the nuclear tensor. In the case of Table 1, the nuclear tensor G has an order of 4 with the number of components (size) of (8×8)×2×48× 60. In the case where face orientations (number of dimensions is 10) and face expressions (number of dimension is 4) are added to the modalities, the nuclear tensor has an order of 7 with the number of components of (8×8)×2×48×60×10×4×5. In this way, when an extra modality is added, the order of the tensor is increased and the number of tensor components increases sharply by the product of the number of dimensions.

FIG. 3 is a conceptual diagram of a tensor projection. Here, the description will be made with a three-dimensional space for the convenience of illustration. The tensor projection allows transfer (projection) from a real space R to an eigenspace A, as well as transfer (projection) between a plurality of eigenspaces A, B, and C.

In FIG. 3, the relationship of projection from the real space R to eigenspace A is represented by the tensor U, and the relationship of projection between the eigenspaces A and B is represented by the tensor $G_1$ or $G_1^{-1}$. Likewise, the relationship of projection between the eigenspaces B and C is represented by the tensor $G_2$ or $G_2^{-1}$, and the relationship of projection between the eigenspaces C and A is represented by the tensor $G_3$ or $G_3^{-1}$. In this way, a conversion pathway (projection route) linking a plurality of eigenspaces may be designed, thereby allowing data to be handled in different spaces.

FIG. 4 illustrates a principle for applying the tensor projection to super resolution image conversion. FIG. 4 illustrates an example process of converting (restoring) a low resolution image to a high resolution image using a projection between a pixel real space, pixel eigenspace, and personal difference (personal feature) eigenspace.

Each pixel of the image data has a value (pixel value) representing a density and may be viewed as coefficient vectors in a multidimensional space with axes representing density values (pixel values) with respect to each pixel position as the bases. For the convenience of explanation, the description will be made using a three-dimensional model shown in FIG. 4. For example, low resolution face image data of a certain person A may be plotted as a certain point $P_{LA}$ in the pixel real space. That is, the coefficient vectors ($x_1, x_2, x_3$) take a certain value ($x_1$) in the range from 0 to 255 on the axis of a first base component $e_1$, and similarly take certain values ($x_2$), ($x_3$) in the range from 0 to 255 on the axes of base components $e_2$ and $e_3$. High resolution face image data of the same person A may be plotted, for example, as a certain point $P_{HA}$ in the pixel real space.

The purpose of conversion is to transfer a point of a low resolution image in the real pixel space to a corresponding high resolution point by the conversion. In the conversion process, a point in the pixel real space R shown in "A" of FIG. 4 is projected onto the pixel eigenspace A using a projection function $U_{pixels}^{-1}$ which makes use of the eigen projection matrix $U_{pixels}$ of locality preserving projection (LPP) ("B" of FIG. 4). The axes (bases) of the pixel eigenspace A correspond to feature axes (eigenvectors) of the LPP and the LPP projection may be viewed as the rotation of coordinate system for converting the axes of the pixel real space R to those of the pixel eigenspace A.

Then, the point projected in the pixel eigenspace A is transferred to the personal difference (personal feature) eigenspace B using the projection function $G_L^{-1}$ that defines the correspondence relationship between the low resolution image and personal difference eigenspace ("C" of FIG. 4). "C" of FIG. 4 also illustrates a point which is a point of the high resolution image in the pixel real space R projected first onto the pixel eigenspace A and then transferred to the personal difference eigenspace B using the projection function $G_H^{-1}$ that defines the correspondence relationship between the high resolution image and personal difference eigenspace. As shown in "C" of FIG. 4, the point of the low resolution image and the point of the high resolution image of the same person may be plotted at substantially the same position in the personal difference eigenspace B. By making use of this property and converting a point in the personal difference eigenspace B obtained by projecting a low resolution point in the pixel real space to a point in the pixel eigenspace A using the projection function $G_H$, the point in the pixel eigenspace A corresponding to the high resolution image may be obtained ("D" of FIG. 4).

After transferring the point in the personal difference eigenspace B to the pixel eigenspace A, the transferred point is further returned to the pixel real space R ("E" of FIG. 4) using the projection function $U_{pixels}$ which makes use of the LPP eigen projection matrix. As described above, by making use of the coincidence between the low resolution image point and high resolution image point in the personal difference space, a low resolution image may be converted to a high resolution image through the route of "C", "D", and "E".

In the personal difference eigenspace in "C" of FIG. 4, the high resolution pixel vector H in the pixel real space may be obtained by the formula shown below on the assumption that V represents the personal difference eigenspace coefficient vector.

$$H = U_{pixels} G_H V$$

Likewise, the low resolution pixel vector L in the pixel real space may be obtained by the formula shown below.

$$L = U_{pixels} G_L V$$

In the case where a high resolution image in the pixel real space is obtained from a low resolution image (low resolution pixel vector L) in the pixel real space through the pixel eigenspace and the personal difference eigenspace, then back to the pixel real space and the pixel real space, the conversion may be achieved by the projection represented by the formula given below from the two formulae above.

$$H = U_{pixels} G_H V = U_{pixels} G_H (U_{pixels} G_L)^{-1} L$$

In the example described above, the projection function ($U_{pixels}$) is obtained from a learning set of pairs of low and high resolution images by making use of the locality preserving projection (LPP) and, based on this, the projection functions $G_L$ and $G_H$ are obtained such that the point in a low resolution image and the point in a high resolution image of the same person substantially coincide with each other. The projection functions ($U_{pixels}$, obtained $G_L$, $G_H$) in the manner as described above and the projection route shown in FIG. 4 allow a low resolution image to be accurately converted to a high resolution image.

Calculation steps for the LPP projection will now be described briefly.

Step 1: obtain a similarity matrix representing similarity between each learning sample (all combinations).

Step 2: obtain a diagonal matrix D by obtaining E of each row of the similarity matrix S.

Step 3: obtain Laplacian matrix L=D−S.

Step 4: solve the following generalized eigenvalue problem, $$X \cdot L \cdot X^T \cdot u = \lambda \cdot X \cdot D \cdot X^T \cdot u$$

For example, (1) cholesky decomposition or (2) generalized eigenvalue problem may be solved by converting it to eigenvalue problem by calculating the inverse matrix.

Step 5: obtain LPP matrix U by sorting eigenvectors u corresponding to eigenvalues λ in ascending order thereof.

Figure 5:
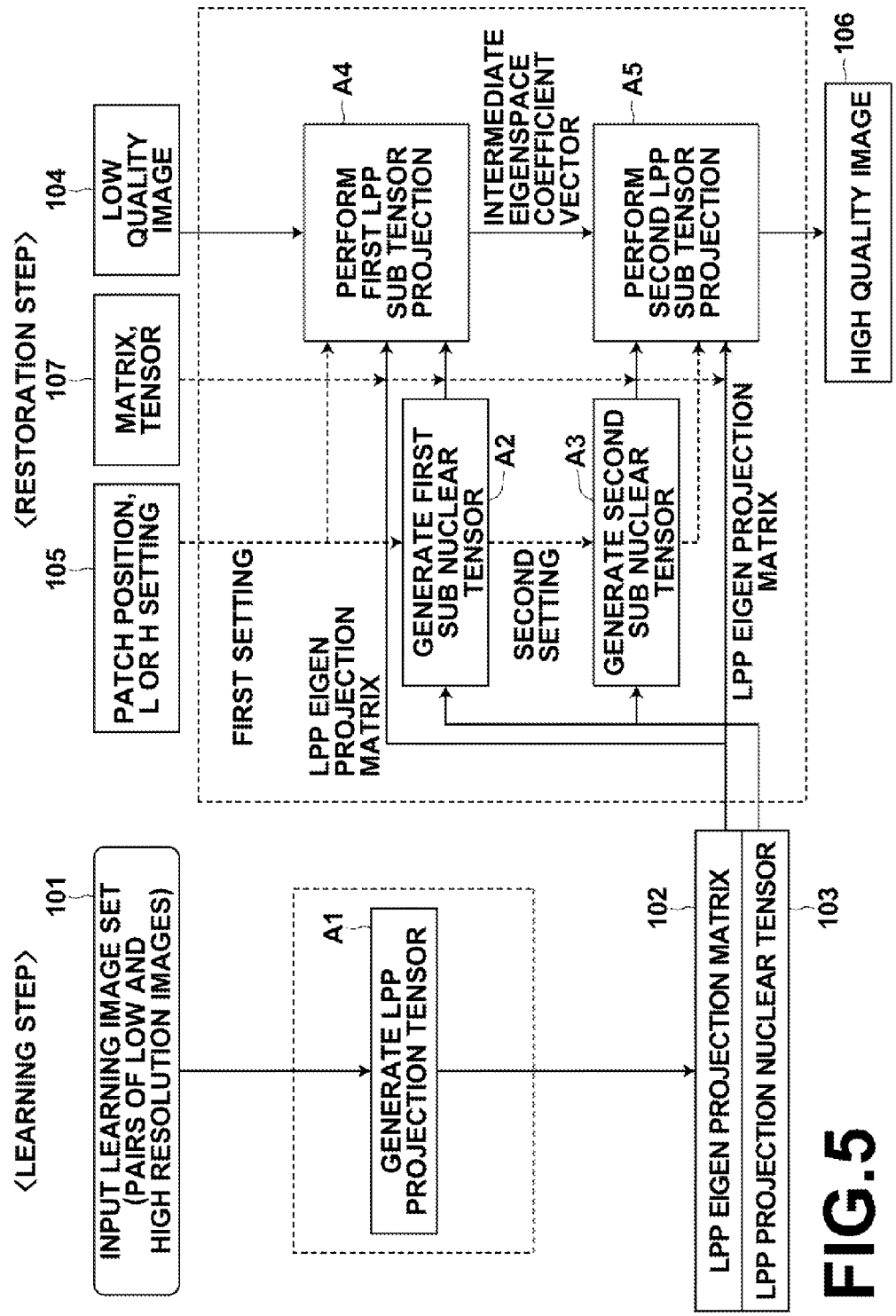
FIG. 5 schematically illustrates super resolution processing.

FIG. 5 schematically illustrates super resolution processing. The processing is broadly divided into a learning step and a restoration step. In the learning step, a learning image group (input learning image set) 101 which includes pairs of low resolution images and high resolution images is inputted. A process for generating a LPP projection tensor is performed by applying the locality preserving projection (LPP) to the inputted learning image group 101 (step A1). In the LPP projection tensor generation step, a LPP eigen projection matrix 102 and a LPP projection nuclear tensor 103 that defines the correspondence relationship between a low quality image and an intermediate eigenspace ("personal difference eigenspace" here) and the correspondence relationship between a high quality image and the intermediate eigenspace are generated.

The LPP is a method that performs coordinate conversion such that the closeness of local values of samples (information of a geometric distance between adjacent values) in the original space (pixel real space, here) is preserved, and coordinate axes are determined such that adjacent samples in the original space are embedded at positions close to each other in the projected space (eigenspace). For example, in the learning image set in Table 1, high and low resolution images of 60 persons may be plotted with respect to each patch position in the pixel real space and the LPP may be applied to the distribution of 120 points, whereby a feature axis focusing on close values (those close in variation) in the distribution may be obtained. In this way, a LPP eigen projection matrix $U_j = \{U_1, U_2, U_3, ---, U_{48}\}$ corresponding to the dimensions of patch positions (48 dimensions in the case of Table 1) may be obtained.

Then, the LPP projection nuclear tensor 103 that includes the correspondence relationship between the low resolution images and personal difference eigenspace (tensor $GL_j = \{GL_1, GL_2, GL_3, ---, GL_{48}\}$ and correspondence relationship between the high resolution images and personal difference eigenspace (tensor $GH_j = \{GH_1, GH_2, GH_3, ---, GH_{48}\}$) is generated using the LPP eigen projection matrix 102. That is, an eigen projection matrix U is obtained with respect to each modality, such as pixel, resolution, and patch position, and a component of the projection nuclear tensor G is obtained using each matrix U, whereby an aggregate of these may be obtained as the projection nuclear tensor G 103.

Note that the feature axis is determined to be arranged (disposed) in the ascending order of eigenvalues. The size of the nuclear tensor may be reduced significantly by reducing the number of dimensions by the use of only superior feature axes having a great influence. For example, in the calculation step, all eigen projection matrices U, including those having a low influence, may be calculated, and in the restoration step, the restoration may be performed using only some of the matrices having a great influence without those having a low influence. An appropriate dimensional compression with respect to each feature axis allows the size of the projection nuclear tensor to be made reasonable.

In the mean time, in the restoration step, a low quality image 104 which is the conversion target is inputted. Further, information 105 specifying a patch position to be processed and identifying the distinction between low and high resolution images is also given.

A first sub nuclear tensor ($GL_j = \{GL_1, GL_2, GL_3, ---, GL_{48}$ in the example of Table 1) corresponding to a low resolution setting, as a first setting, is generated from the LPP projection nuclear tensor G103 (step A2). Further, a second sub nuclear tensor ($GH_j = \{GH_1, GH_2, GH_3, ---, GH_{48}$ in the example of Table 1) corresponding to a high resolution setting, as a second setting, is generated (step A3).

As the LPP projection nuclear tensor 103 is generated based on each eigenvector corresponding to each modality and is an aggregate that includes projection components of all modalities, it is necessary to select a component to be used for restoration processing. For example, in the projection route described with reference to FIG. 4, if a decision is made to use the "personal difference" eigenspace as the intermediate eigenspace (space at the turn-around point in the projection route), then the corresponding sub nuclear tensors $G_L$ and $G_H$ may be selected out. Note that the processes up to that of generating the sub nuclear tensors to be actually used as described above may be included in the learning step.

Then, projection is performed with respect to the data of the low quality image inputted in the restoration step using the LPP eigen projection matrix 102 and the first sub nuclear tensor (step A4) to calculate an intermediate eigenspace coefficient vector. This step of first LPP sub tensor projection corresponds to the projection in the route of "A" through "B" to "C" of FIG. 4. Next, the obtained intermediate eigenspace coefficient vector is projected using the second sub nuclear tensor and LPP eigen projection matrix 102 (step A5) to obtain a high quality image 106. This step of second LPP sub tensor projection corresponds to the projection in the route of "C" through "D" to "E" of FIG. 4.

The first and second LPP sub tensor projection steps in the restoration step are performed with respect to each patch based on the patch position information. When performing calculations in these projection steps, information 107 that specifies whether the projection function is a matrix or a tensor is given, as shown in FIG. 5, and projection using the LPP eigen projection matrix or projection using the sub nuclear tensor is selected according to the information.

Now, referring back to FIG. 1, the high resolution conversion unit 15 enlarges a portion of the restored reduced image other than the area corresponding to the region of interest by applying the prediction process that uses a learning result obtained by learning images in advance. For example, when enlarging the restored reduced image, a prediction process focusing on a general characteristic of an image signal to be described herein below is performed to predict and interpolate information not included in the low resolution restored reduced image.

The prediction process focusing on a general characteristic of an image signal will now be described. In the prediction process focusing on a general characteristic of an image signal, information not present in the low resolution image is interpolated through a conversion (interpolation) using interpolation filter coefficients that define transformation relationship between low and high resolution images to generate a high resolution image. For example, the low resolution image has a size of 320×240 pixels, and a high resolution image having a size of, for example, 640×480 pixels is generated from the low resolution image.

In the learning step, learning is performed using high and low resolution image pairs in advance to obtain interpolation filter coefficients that define transformation relationship, as a preparatory step for performing image processing. A low resolution image is generated, for example, by skipping pixels at regular intervals from a counterpart high resolution image. In the restoration step, a high resolution output image is obtained from any low resolution image using the interpolation filter coefficients obtained in the learning step.

First, the learning step will be described. FIG. 6A illustrates a schematic configuration for learning step. A high resolution image x file (learning images x) is used as an input image. Reduction processing, low-pass filtering, and the like are performed on the high resolution image x file to generate a low resolution image z file (step B1). Filtering is performed on the high resolution image x file and low resolution image z file using a high-pass filter to extract a high frequency component from both images, thereby generating a high frequency high resolution image x' file and a high frequency low resolution image z' file (step B2). The pair of the high frequency high resolution image x' file and high frequency low resolution image z' file constitutes a patch pair.

As an example high frequency component extracted by the high frequency extraction processing, the Nyquist frequency in the sampling theorem may be cited. That is, performance of the high frequency component extraction processing on the input image with the frequency corresponding to the Nyquist frequency of the output image as the threshold value allows an image degrading factor included in a low frequency component of the input image to be eliminated, whereby a desirable high quality image may be restored. The high frequency component extracted by the high frequency component extraction processing may be a so-called cut-off frequency (frequency at which response is down by 3 dB) and is set, as appropriate, according to conditions of the input image (low resolution image) and output image (high frequency image).

After the high frequency component extraction, a representative high frequency image $z'_i$ ("i" is the class number) is generated with respect to each class from the high frequency low resolution image z' file (image vectors z') (step B3). In the representative high frequency image generation processing, image vectors z' are converted to a representative value and as many representative high frequency images $z'_i$ as the number of classes are generated. With respect to the representative high frequency image $z'_i$, for example, a method in which an Expectation-Maximization (EM) algorithm is applied to a mixture normal distribution model (GMM) is applied. That is, an estimation of the conditional probability is performed in the E step of the EM algorithm and maximization of the likelihood function is performed using the value estimated in the M step to maximize the likelihood function with the current conditional probability, then a next conditional probability is obtained to maximize the likelihood function with the next conditional probability, and the loop calculation of the E step and M step is repeated until the output of the likelihood function is stabilized.

Note that a Dirichlet mixture model or the like may be used other than the GMM, and a variational Bayesian method, an MCMC (Markov Chain Monte Carlo), a Gibbs sampler, or the like may be used instead of the EM algorithm.

In the above calculation, a center of gravity for each class of the image vectors z' may be obtained and classified by a k-means method, and set in an initial state. For example, in order to learn a hundred thousand pixels based on 100 classes, the learning is performed about ten-thousand times. In this case, the convergence condition is $e^{-10}$. In the representative high frequency image generation process, the calculation processing represented by the following formulae (1) to (4) is repeatedly performed.

$$N_i^{(k+1)} = \sum_{s \in S} p_{i|z'}(i \mid z'_s, \theta^{(k)}) \sum p_{z|i}. \tag{1}$$

$$\pi_i^{(k+1)} = N_i^{(k+1)} / N \tag{2}$$

$$z_i^{(k+1)} = (1/N_i) \sum_{s \in S} z'_s p_{i|z'}(i \mid z'_s, \theta^{(k)}) \tag{3}$$

$$\sigma^{2(k+1)} = (1/d) \sum_{i=1}^{M} [\pi_i^{(k+1)} \Xi_i] \tag{4}$$

where, $$\Xi_i = (1/N_i^{(k+1)}) \sum_{s \in S} \|z'_s - z_i^{(k+1)}\|^2 P(i \mid z'_s \cdot \theta^{(k)})$$

where, "N" in formula (1) above represents the number of training vectors (z, x) generated from a pair (training set) of high resolution image x file and low resolution image z file. When a pixel set of the low resolution image in the pair of the training set is taken as S, the training vectors extracted from the training set are represented as $\{(z_s, x_s)\}_s \in s$.

"$\pi_i$" in formula (2) above is an existence probability of $i^{th}$ class, and, "$p_i|z'$ (i|z',θ)" in formula (3) above is a probability of the high frequency image z' existing in a class i, and "$p_i|z'$ (i|z')" is a multivariate Gaussian density equation or a multivariate Dirichlet density equation for i and z'. "$\sigma^2$" in formula (4) is an average of sample variance of elements of the image vector z', "d" is the number of elements of the image vector z', and "M" is the number of classes. It should be noted that maximum likelihood estimation for "θ" in formula (2) is performed by the EM algorithm (θmax is decided), and θmax is substituted, so that "θ" becomes nonexistent as a variable.

Finally, interpolation filter coefficients $A'_i$, $B_i$, and $\pi_i$ used for the interpolation calculation in the restoration step are generated based on the high frequency high resolution image x' file and high frequency low resolution image z' file, and representative high frequency image $z'_i$ (step B4). In the interpolation filter coefficient generation process, the interpolation filter coefficients $A'_i$, $B'_i$ and $\pi_i$ are generated by inputting the pair of high frequency high resolution image x' file and high frequency low resolution image z' file, as well as the representative high frequency image $z'_i$. The interpolation filter coefficient $A'_i$ is an interpolation matrix, and is represented by the formula (5) given below. The interpolation filter coefficient $B'_i$ is a bias vector, and is represented by the formula (6) given below. $\pi_i$ represented by the formula (2) above is an existence probability (contribution rate) of the $i^{th}$ class, and is normalized such that the sum of all classes becomes 1.

$$A'_i = \sum_{x'z'|i} \sum_{z'z'|i}^{-1} \tag{5}$$

$$B'_i = v_{x'|i} - \sum_{x'z'|i} \sum_{z'z'|i}^{-1} v_{z'|i} \tag{6}$$

where, $1 \leq i \leq M$, $$v_i \stackrel{def}{=} \begin{pmatrix} v_{x'|i} \\ v_{z'|i} \end{pmatrix}$$

$$= (1/N_i) \sum_{s \in S} b_s p_{i|zs'}(i \mid z'_s, \theta)$$

$$\sum_i \stackrel{def}{=} \begin{pmatrix} \sum_{x'x'|i} \sum_{x'zs'|i} \\ \sum_{x'z'|i}^1 \sum_{z'z'|i} \end{pmatrix}$$

$$= \frac{1}{N_i} \sum_{s \in S} b_s b_s^1 p_{i|y}(i \mid z'_s, \theta)$$

$$b_s \stackrel{def}{=} \begin{pmatrix} x'_s \\ z'_s \end{pmatrix}$$

Note that the interpolation filter coefficients $A'_i$, $B'_i$, and $\pi_i$ are described only by way of example and the interpolation filter coefficients are determined as appropriate depending on the interpolation calculation in the restoration step.

Figure 6B:
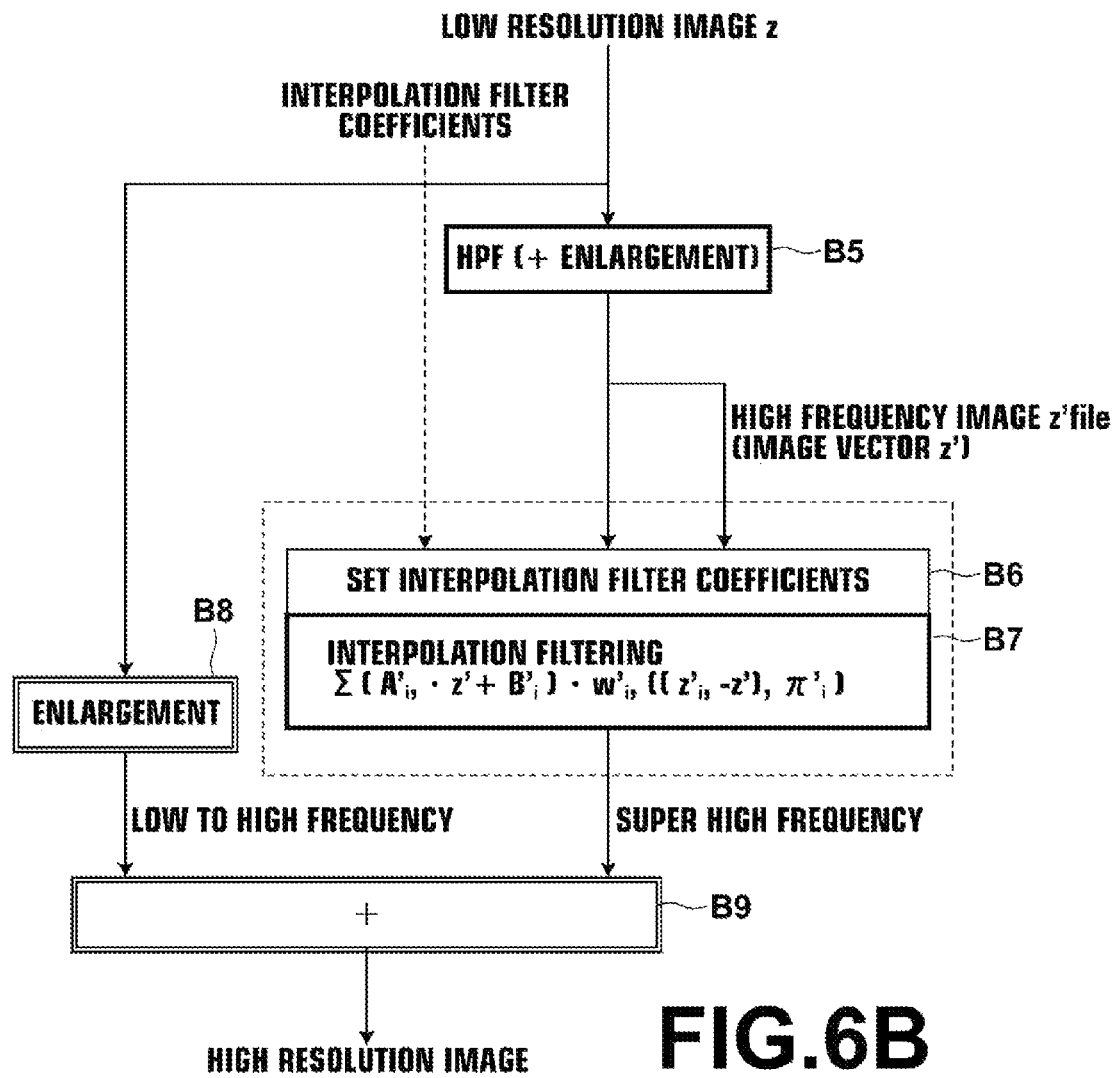
FIG. 6B illustrates a schematic configuration for reconstruction step.

Next, the restoration step will be described. FIG. 6B illustrates a schematic configuration for the reconstruction step. In the restoration step, the processing may be performed with respect to each patch provided by dividing the input image into a predetermined size or with respect to each pixel. Here, the description will be made of a case in which the input image is divided into a plurality of patches of a predetermined size and the processing is performed with respect to each patch.

As a restoration target image, a low resolution image Z is inputted. A high frequency component is extracted from the low resolution image z to generate a high frequency low resolution image z' file (image vector z') (step B5). This step may have a configuration in which the enlargement process is added to the process for suppressing the low frequency and medium-frequency components using a high-pass filter (high frequency extraction process). The high frequency component extraction process in step B5 may be the same as that for generating the high frequency low resolution image z' file in step B2 shown in FIG. 6A.

Then, the interpolation filter coefficients $A'_i$, $B'_i$ $\pi_i$, and representative high frequency image $z'_i$ generated in the learning step are set with respect to each pixel of the inputted image (step B6). In this step, a weight according to the inputted low resolution image is set as well as the interpolation filter coefficients $A'_i$, $B'_i$, $\pi_i$, and representative high frequency image $z'_i$.

Then, filtering is performed on the image vector Z' generated from the low resolution image z using the interpolation filter coefficients $A'_i$, $B'_i$, $\pi_i$, and representative high frequency image $z'_i$ set in step B6 (step B7). In this step, a process for converting the image vector z' to a super high frequency high resolution image (an image interpolated with information not included in the low resolution image z) is performed using the interpolation filter coefficients $A'_i$, $B'_i$, $\pi_i$, and representative high frequency image $z'_i$ set in step B6. In the conversion process, a Gaussian mixture model (Gaussian mixture distribution) represented by the formula (7) given below is assumed. Note that a mixture multinomial distribution, such as a Dirichlet mixture model, may be modified instead of using the Gaussian mixture model.

$$x' = \Sigma(A_i \cdot z' + B_i) \cdot w_i'((z_i' - z'), \pi_i) \tag{7}$$

That is, the image vector z' is multiplied by the interpolation matrix $A'_i$ of class i corresponding to each processing target pixel and the bias vector $B'_i$ is added to a result of this multiplication. Then, the resultant is further weighted by a weight $w_i$ calculated with respect to each processing target pixel and a weighted sum of all classes is obtained. The weight $w_i$ is calculated according to the difference between the representative high frequency image $z'_i$ and image vector z' (Euclidean distance in vector space), and the contribution rate $\pi_i$ of each class of target pixels.

Further, an enlargement process is performed on the inputted low resolution image z using a bicubic method or the like (step B8). Thereafter, low to high frequency components of the low resolution image enlarged in step B8 are added to the super high frequency component (step B9). Thus, a high resolution image which includes all frequency components ranging from the low frequency component to super high frequency component is generated in this step.

Hereinafter, an operation of the image compression apparatus 10 will be described. FIG. 7 is a flowchart illustrating an image compression procedure. A compression target image is inputted to the image compression apparatus (step C1). The image reducing unit 11 reduces the inputted image having a first resolution to an image having a second resolution (step C2). The reduced image compression unit 12 compresses the reduced image to generate reduced image compression data (step C3). In the case where the inputted image is a moving picture, the reduced image compression unit 12 may compress the reduced image using images in the previous and after frames. The reduced image compression data are supplied to the storage/transmission unit 18 and reduced image expansion unit 13. The reduced image expansion unit 13 expands the reduced image compression data to restore the reduced image (step C4).

The region of interest setting unit 14 sets a region of interest corresponding to a predetermined target object in the input image inputted in step C1 (step C5). The region of interest setting unit 14 may set, for example, a face portion in the input image as the region of interest. The high resolution conversion unit 15 converts a partial image of an area of the reduced image restored in step C4 corresponding to a region of interest set by the region of interest setting unit 14 to a high resolution (first resolution) partial image by applying a prediction process that uses a learning result obtained by learning person's faces in advance (step C6). For example, with respect to a region of interest set for a person's face, the high resolution conversion unit 15 converts a face portion image of the low resolution reduced image to a high resolution face portion image using a transformation function (tensor defining projection) generated by learning face images in advance.

The high resolution conversion unit 15 enlarges a portion of the restored reduced image other than the area corresponding to the region of interest to a size of the input image (step C7). For example, in the case where the image is reduced to ¼ of the size in step C2, the high resolution conversion unit 15 enlarges the restored reduced image to 4 times its size. Here, the high resolution conversion unit 15 may, for example, perform a prediction process focusing on a general characteristic of an image signal to predict and interpolate information not included in the low resolution restored reduced image. The high resolution conversion unit 15 may interpolate information not included in the low resolution restored reduced image, for example, by a conversion operation using interpolation filter coefficients generated by learning images of the same type of the input image in advance.

The high resolution conversion unit 15 combines the first resolution partial image corresponding to the region of interest converted in step C6 with the restored reduced image interpolated/enlarged in step C7 to generate a combined image (step C8). The differential image generation unit 16 generates a differential image between the input image inputted in step C1 and combined image generated in step C8 (step C9). With respect to the region of interest portion, the differential image generation unit 16 takes a difference between the input image and the first resolution partial image of the region of interest portion converted in step C6. With respect to the area other than the region of interest, the differential image generation unit 16 takes the difference between the input image and restored reduced image interpolated/enlarged in step C7. The differential image encoding unit 17 encodes the differential image generated in step C9 to generate differential image encoded data (step C10).

The storage/transmission unit 18 outputs the reduced image compression data generated in step C3, differential image encoded data generated in step C10, and position information of the region of interest set in step C5 as compressed image data of the input image (step C11). The outputted compress image data are stored, for example, in a storage unit (not shown) or transmitted to a device on the receiving side (not shown) via a network.

An image expansion apparatus for expanding the compression data by the image compression apparatus will now be described. FIG. 8 schematically illustrates the image expansion apparatus. The image expansion apparatus 30 includes an input unit 31, a reduced image restoration unit 32, a high resolution image generation unit 33, a differential image restoration unit 34, and an image combining unit 35. The operation of each unit in the image expansion apparatus 30 may be realized by a computer that operates according to a predetermined program.

The input unit 31 inputs the compressed image data, i.e., the reduced image compression data, differential image encoded data, and position information of the region of interest, outputted from the image compression apparatus 10 shown in FIG. 1. For example, the input unit 31 reads out the compressed image data from a storage unit. Alternatively, the input unit 31 receives the compressed image data transmitted from the image compression apparatus 10 via a network. The input unit 31 passes the inputted reduced image compression data to the reduced image restoration unit 32 and the inputted differential image encoded data to the differential image restoration unit 34.

The reduced image restoration unit 32 restores a reduced image by expanding the reduced image encoded data. The reduced image restoration unit 32 expands the reduced image encoded data by an algorithm identical to that of the reduced image expansion unit 13 in the image compression apparatus 10 shown in FIG. 1. The reduced image expanded by the reduced image expansion unit 13 and the reduced image restored by the reduced image restoration unit 32 are identical images. The reduced image restoration unit 32 passes the restored reduced image to the high resolution image generation unit 33.

The high resolution image generation unit 33 receives the position information of the region of interest from the input unit 31. The high resolution image generation unit 33 converts a partial image of the area of the reduced image restored by the reduced image restoration unit 32 corresponding to the region of interest to a high resolution (first resolution) partial image. This conversion is identical to the conversion of the image of the region of interest portion by the high resolution conversion unit 15 in the image compression apparatus 10. That is, high resolution image generation unit 33 converts an image of an area of the restored reduced image corresponding to the region of interest to an image having the first resolution by applying a prediction process that uses a learning result obtained by learning a predetermined target object in advance.

In addition, the high resolution image generation unit 33 enlarges the restored reduced image to a size of the input image by applying a prediction process that uses a learning result obtained by learning images in advance. This enlargement process is identical to that for the area other than the region of interest performed by the high resolution conversion unit 15 in the image compression apparatus 10. The high resolution image generation unit 33 superimposes the region of interest portion image converted to the first resolution and the image obtained by enlarging the restored reduced image on top of each other to generate a high resolution image combining the both images. The high resolution image generated by the high resolution image generation unit 33 and the combined image generated by the high resolution conversion unit 15 in the image compression apparatus are identical images.

The differential image restoration unit 34 restores a differential image by decoding the differential image encoded data. The differential image restoration unit 34 decodes the differential image by an algorithm corresponding to the encoding algorithm of the differential image encoding unit 17 in the image compression apparatus 10. The image combining unit 35 combines the high resolution image generated by the high resolution image generation unit 33 with the differential image restored by the differential image restoration unit 34. The combining of the high resolution image with the differential image by the image combining unit 35 may yield an image corresponding to the input image of the image compression apparatus 10 to be restored.

FIG. 9 illustrates an image expansion procedure. For example, the input unit 31 reads out the reduced image compression data, differential image encoded data, and position information of the region of interest from a storage unit (not shown) (step D1). The reduced image restoration unit 32 expands the inputted reduced image compression data (step D2). The expansion of the reduced image compression data may restore a reduced image which is the same in content as the reduced image generated by the image reducing unit 11 in the image compression apparatus 10 by reducing the input image. Note that the restored reduced image is not necessarily in exact match with the reduced image generated by the image reducing unit 11.

The high resolution image generation unit 33 receives the position information of the region of interest from the input unit 31 and identifies the area of the restored reduced image corresponding to the region of interest. The high resolution image generation unit 33 converts the partial image of the area of the reduced image restored in step D2 corresponding to the region of interest to a high resolution (first resolution) partial image by applying a prediction process that uses a learning result obtained by learning a predetermined target object in advance (step D3). The conversion to the first resolution partial image may be the same as the conversion to the first resolution partial image of step C6 shown in FIG. 7.

With respect a portion of the restored reduced image other than the area corresponding to the region of interest, the high resolution image generation unit 33 enlarges the restored reduced image by a predetermined magnification ratio (step D4). In the case where the input image is reduced, for example, to ¼ of the input image by the image reducing unit 11 in the image compression apparatus 10, high resolution image generation unit 33 enlarges the restored reduced image to 4 times its size. Here, the high resolution image generation unit 33 may, for example, perform a prediction process focusing on a general characteristic of an image signal to predict and interpolate information not included in the low resolution reduced image. The enlargement of the reduced image in step D4 may be identical to the enlargement of the reduced image in step C7 shown in FIG. 7.

The high resolution image generation unit 33 superimposes the region of interest portion image converted to the first resolution in step D3 and the reduced image interpolated/enlarged in step D4 on top of each other to generate a high resolution image (step D5). The high resolution image generated in step D5 is the same in content as the combined image generated in step C8 shown in FIG. 7.

The differential image restoration unit 34 expands the differential image encoded data to restore a differential image (step D6). Expansion of the differential image encoded data may restore a differential image which is the same in content as the differential image generated by the differential image generation unit 16 in the image compression apparatus 10. The restored differential image is not necessarily in exact match with the differential image generated by the differential image generation unit 16. The image combining unit 35 combines the high resolution image generated in step D5 with the differential image restored in step D6 to restore an image corresponding to the input image of the image compression apparatus 10 (step D7).

In the present embodiment, a region of interest corresponding to a predetermined target object is set in an input image by the region of interest setting unit 14. The high resolution conversion unit 15 converts a partial image of an area of a reduced image obtained by reducing the input image corresponding to the region of interest to a first resolution by applying a prediction process that uses a learning result obtained by learning a predetermined target object in advance. In the present embodiment, conversion from a low resolution image to a high resolution image is performed using a learning result obtained by learning a predetermined target object in advance. This allows a predetermined target object image having the first resolution to be predicted from a predetermined target object image having a low resolution with high prediction accuracy. Consequently, with respect to the portion of the predetermined target object (region of interest portion), the difference between the image converted to the first resolution from the restored reduced image by the high resolution conversion unit 15 and the original input image may be reduced. The present embodiment may restore a high quality image with a smaller difference using the differential image and, therefore, may realize a higher compression rate in comparison with Patent Document 1 by that much.

Here, in the case where the region of interest portion of the reduced image is converted to the first resolution by making use of the prediction process using a characteristic amount for segmenting the target object, when the position of a certain person's face in the personal difference eigenspace ("C" in FIG. 4) is the anticipated position, the person's face may be converted accurately from a low resolution image to a high resolution image. If the position of the face in the personal difference eigenspace is displaced from the anticipated position, however, the person's face converted from a low resolution image may sometimes become a different person's face. As present embodiment uses the differential image so that, even in the case where a face image converted from a low resolution image would differ largely from the face in the input image, the face in the input image may be restored by the image expansion apparatus 30, though the difference becomes large.

Here, the description has been made of the case where the differential image generation unit 16 generates a differential image for each of the region of interest portion and the other portion, but the difference may be taken only for the region of interest portion. In that case, the high resolution conversion unit 15 may convert only a partial image of the area of the restored reduced image corresponding to the region of interest to the first resolution. The differential image generation unit 16 may generate the difference between the region of interest portion image converted to the first resolution and the region of interest portion image in the input image as the differential image. In the case of surveillance camera images, for example, there may be the case where a predetermined target object, such as a person's face, is desired to be restored with high quality while the other back ground portion is not required to be restored with high quality. In such a case, a higher compression rate may be realized by transferring only a differential image of the region of interest portion.

A second embodiment of the present invention will now be described. FIG. 10 illustrates an image compression apparatus according to the second embodiment of the present invention. The image compression apparatus 10a of the present embodiment differs from the image compression apparatus 10 shown in FIG. 1 in that it includes a plurality of region of interest setting units 14. The plurality of region of interest setting units 14 set regions of interest respectively, each corresponding to each of a plurality of target objects of different types. The predetermined target objects may include a person's face, a name tag portion, a person's hand (adjacent portion of the hand), and the like. For example, image compression apparatus 10a includes a region of interest setting unit 14 for setting a region of interest on a person's face, a region of interest setting unit 14 for setting a region of interest on a name tag portion, and a region of interest setting unit 14 for setting a region of interest on an adjacent portion of a person's hand.

Figure 11:
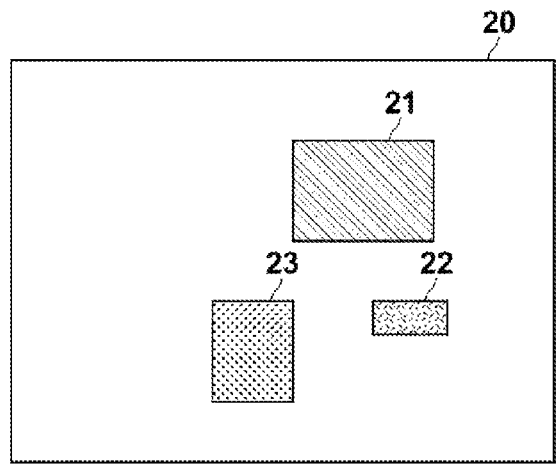
FIG. 11 is a diagram illustrating regions of interest set in the second embodiment.

FIG. 11 illustrates regions of interest set in the second embodiment. Here, the description will be made of the case where three regions of interest with respect to three types of targets (objects) are set in an input image by three region of interest setting units A to C. The region of interest setting unit A sets the region of interest 21 corresponding to, for example, a person's face portion in the input image 20. The region of interest setting unit B sets the region of interest 22 corresponding to, for example, a name tag portion in the input image 20. The region of interest setting unit C sets the region of interest 23 corresponding to, for example, an portion of a person's hand in the input image 20. Each of the region of interest setting units may set a plurality of regions of interest for each type of target object.

With respect to each type of region of interest, the high resolution conversion unit 15 converts a partial image of the portion of the reduced image corresponding to the region of interest to a partial image having a high resolution (first resolution) by applying a prediction process that uses a learning result obtained by learning each target object. With respect, for example, to the region of interest 21 set on a person's face, the high resolution conversion unit 15 converts an image of the portion of the low resolution reduced image corresponding to the region of interest 21 to a high resolution image using a transformation function (tensor defining projection) generated by learning face images in advance. With respect, for example, to the region of interest 22 set on a name tag portion, the high resolution conversion unit 15 converts an image of the portion of the low resolution reduced image corresponding to the region of interest 22 to a high resolution image using a transformation function generated by learning name tag images in advance. With respect, for example, to the region of interest 23 set on an adjacent portion of a person's hand, the high resolution conversion unit 15 converts an image of the portion of the low resolution reduced image corresponding to the region of interest 23 to a high resolution image using a transformation function generated by learning adjacent portion images of a person's hand in advance.

The operation procedure of the image compression apparatus 10*a* of the present embodiment is basically identical to that of the image compression apparatus 10 of the first embodiment. Each region of interest setting unit 14 sets a region of interest corresponding to each target object in step C5. The high resolution conversion unit 15 converts an image of the portion of the reduced image corresponding to each region of interest to an image of the first resolution by a prediction process according to each type of region of interest in step C6. The storage/transmission unit 18 outputs position information of each region of interest together with information indicating the type of each region of interest, in addition to reduced image compression data and differential image encoded data in step C11.

The configuration of the image expansion apparatus of the present embodiment is similar to that of the image expansion apparatus of the first embodiment shown in FIG. 8. In the image expansion apparatus of the present embodiment, the high resolution image generation unit 33 converts a partial image of the portion of the reduced image corresponding to the region of interest to a partial image having a high resolution (first resolution) with respect to each type of region of interest by applying a prediction process that uses a learning result obtained by learning each target object, as in the high resolution conversion unit 15 in the image compression apparatus 10*a*. The operation of the image expansion apparatus of the present embodiment is basically identical to that of the image expansion apparatus 30 of the first embodiment shown in FIG. 9.

In the present embodiment, a plurality of regions of interest is set in an input image using a plurality of region of interest setting units 14. With respect to each type of region of interest, a partial image of the portion of the reduced image corresponding to the region of interest is converted to a partial image having the first resolution by the high resolution conversion unit 15. This allows each target object to be converted from a low resolution reduced image to a high resolution image with high accuracy. This may reduce the difference of each region of interest portion and more efficient compression may be achieved. Other advantageous effects are identical to those of the first embodiment.

Figure 12:
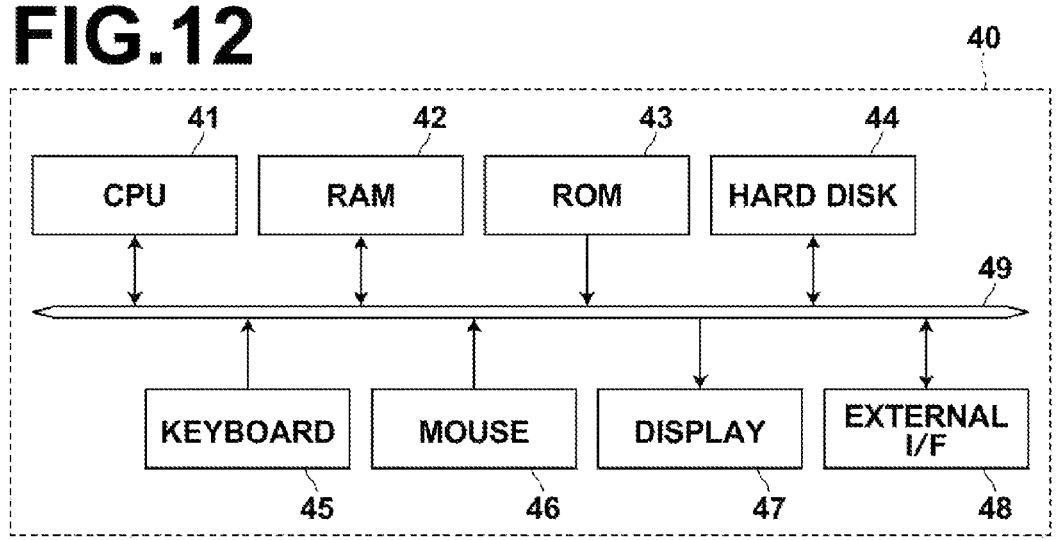
FIG. 12 is a block diagram illustrating an example hardware configuration capable of realizing the image compression apparatus and image expansion apparatus.

FIG. 12 illustrates an example hardware configuration capable of realizing the image compression apparatus and image expansion apparatus of the present invention. The computer 40 includes a CPU (central processing unit) 41, RAM (random access memory) 42, ROM (read only memory) 43, hard disk device 44, keyboard 45, mouse 46, display 47, and external interface 48. In the computer 40, each component is interconnected via the bus 49.

The CPU 41 performs overall control of the computer 40. The RAM 42 is used as a work area or the like when various programs are executed by the CPU 41. The ROM 43 includes various control programs and the like. The hard disk device 44 is an auxiliary storage device and includes, for example, programs required for causing the computer 40 to function as the image compression apparatus 10 (FIG. 1) or as the image expansion apparatus 30 (FIG. 8). The hard disk device 44 may also include processing target input image data and compression image data.

The keyboard 45 and mouse 46 are input devices and used by the user to enter various types of information and commands to the computer. The display 47 displays various images and various types of information. The external interface 48 exchanges information with an externally connected device. For example, a camera may be connected to the external interface 48. For example, the computer functioning as the image compression apparatus 10 may receive processing target input image data via the external interface 48.

Programs stored in the hard disk device 44 are read out by the CPU 41 and deployed in the RAM 42. Each component shown in FIG. 1 or 8 is logically configured in the computer 40 when the computer operates according to the readout programs. In addition, a series of steps shown in FIG. 7 or 9 is performed by the CPU 41. The display 47 may display, for example, the image restored in step D7 in FIG. 9.

So far the present invention has been described based on preferred embodiments, but the image compression apparatus, image expansion apparatus, and methods and programs thereof according to the present invention are not limited to the embodiments described above. It should be understood that various modifications and changes made to the aforementioned embodiments are included in the scope of the present invention.

What is claimed is:

1. A non-transitory computer-readable medium storing a program, the program when executed performs image compression using at least one processor which comprises:

an image reducing unit that reduces an input image having a first resolution at a predetermined reduction ratio to generate a reduced image having a second resolution lower than the first resolution;

a reduced image compression unit that compresses the reduced image to generate reduced image data;

a reduced image expansion unit that expands the reduced image data;

a region of interest setting unit that sets a region of interest corresponding to a predetermined target object in the input image;

a high resolution conversion unit that converts a partial image of an area of the expanded reduced image corresponding to the region of interest to a partial image having the first resolution by applying a prediction process that uses a learning result obtained by learning the predetermined object in advance;

a differential image generation unit that generates a differential image by taking a difference between the partial image converted to the first resolution and a partial image of the region of interest portion of the input image;

a differential image encoding unit that encodes the differential image to generate differential image data; and an output unit that outputs the reduced image data and the differential image data.

2. The non-transitory computer-readable medium storing a program which when executed performs image compression using said at least one processor as recited in claim 1,
   wherein the prediction process is a process that uses a characteristic amount for segmenting a target.

3. The non-transitory computer-readable medium storing a program which when executed performs image compression using said at least one processor as recited in claim 1,
   wherein the region of interest setting unit is provided in plurality and the plurality of region of setting units set regions of interest respectively, each corresponding to each of a plurality of different types of target objects.

4. The non-transitory computer-readable medium storing program which when executed performs image compression using said at least one processor as recited in claim 1,
   wherein the output unit is a unit that further outputs position information of the region of interest set by the region of interest setting unit.

5. The non-transitory computer-readable medium storing a program which when executed performs image compression using said at least one processor as recited in claim 1, wherein:
   the high resolution conversion unit is a unit that enlarges at least a portion of the expanded reduced image other than an area corresponding to the region of interest to a size of the input image by applying a prediction process that uses a learning result obtained by learning images in advance and generates a combined image by combining the enlarged image and the partial image converted to the first resolution; and
   the differential image generation unit is a unit that generates a difference between the input image and the combined image as a differential image.

6. The non-transitory computer-readable medium storing a program which when executed performs image compression using said at least one processor as recited in claim 5,
   wherein the high resolution conversion unit is a unit that, when enlarging the expanded reduced image, predicts and interpolates information not included in the expanded reduced image by applying a prediction process focusing on a general characteristic of an image signal.

7. A non-transitory computer-readable medium storing an image expansion program, the image expansion program when executed performs image expansion for expanding an image compressed by the use of the program that performs image compression in accordance with claim 1, the image expansion program when executed performs image expansion using at least one processor which comprises:

an input unit that inputs the reduced image data and the differential image data outputted from the at least one processor that performs image compression;
a reduced image restoration unit that restores a reduced image by expanding the reduced image data;
a high resolution image generation unit that converts a partial image of an area of the restored reduced image corresponding to the region of interest to a partial image having the first resolution by applying a prediction process that uses a learning result obtained by learning a predetermined target object in advance, enlarging at least a portion of the restored reduced image other than the area of the restored reduced image corresponding to the region of interest to a size of the input image of the at least one processor that performs image compression, and superimposing the enlarged image and the partial image converted to the first resolution on top of each other to generate a high resolution image;
a differential image restoration unit that restores a differential image by decoding the differential image data; and
an image combining unit that combines the high resolution image with the restored differential image to restore an image corresponding to the input image of the at least one processor that performs image compression.

8. An image compression method which, when executed, causes a processor to perform the steps of:
   reducing, using said processor, an input image having a first resolution at a predetermined reduction ratio to generate a reduced image having a second resolution lower than the first resolution;
   compressing the reduced image to generate reduced image data;
   expanding the reduced image data;
   setting a region of interest corresponding to a predetermined target object in the input image;
   converting a partial image of an area of the expanded reduced image corresponding to the region of interest to a partial image having the first resolution by applying a prediction process that uses a learning result obtained by learning the predetermined object in advance;
   generating a differential image by taking a difference between the partial image converted to the first resolution and a partial image of the region of interest portion of the input image;
   encoding the differential image to generate differential image data; and
   outputting the reduced image data and the differential image data.

* * * * *